United States Patent [19]

Schenk et al.

[11] Patent Number: 5,259,641
[45] Date of Patent: Nov. 9, 1993

[54] AIR BAG ATTACHMENT DEVICE

[75] Inventors: David P. Schenk, Miamisburg; James L. Webber, Spring Valley, both of Ohio

[73] Assignee: General Motors Corporation, Detroit, Mich.

[21] Appl. No.: 840,901

[22] Filed: Feb. 25, 1992

[51] Int. Cl.⁵ .............................................. B60R 21/16
[52] U.S. Cl. ................................... 280/731; 280/732; 248/27.3; 403/51; 403/238
[58] Field of Search ............... 280/728, 730, 731, 743, 280/736, 741, 732; 248/27.3; 403/51, 50, 134, 238

[56] References Cited

U.S. PATENT DOCUMENTS

| | | | |
|---|---|---|---|
| 3,193,613 | 7/1965 | Van Buren | 248/27.3 X |
| 4,063,660 | 12/1977 | Ware | 248/27.3 X |
| 4,934,735 | 6/1990 | Embach | 280/731 |
| 4,988,119 | 1/1991 | Hartmeyer | 280/743 |
| 5,064,218 | 11/1991 | Hartmeyer | 280/731 X |
| 5,094,477 | 3/1992 | Togawa | 280/728 X |
| 5,141,247 | 8/1992 | Barth | 280/728 |

FOREIGN PATENT DOCUMENTS 455142 2/1992 Japan .................. 280/728

*Primary Examiner*—David M. Mitchell
*Assistant Examiner*—Gary C. Hoge
*Attorney, Agent, or Firm*—Charles E. Leahy

[57] ABSTRACT

An inflatable vehicle passenger restraint system includes an air bag, a circular inflator, an inflator base plate, and a circular retainer ring. The air bag has a circular central opening flanked by 12 circumferentially-spaced mounting holes, and the base plate has a mating circular central opening and 12 circumferentially-spaced mounting holes, each corresponding to an air bag mounting hole. The inflator has four spaced mounting holes mating with four of the air bag and base plate mounting holes. The retainer ring has four circumferentially-spaced mounting holes corresponding to the four air bag and base plate mounting holes. Eight integral, circumferentially-spaced spring tabs are lanced out of the ring to extend from the surface of the retainer ring. The tabs correspond to the remaining eight air bag and base plate mounting holes. The ring is placed inside the air bag and the tabs are extended out through the air bag mounting holes. The tabs have a diametrical spacing greater than the closest diametric spacing of the base plate mounting holes, through which the tabs are forced to grip the base plate to clamp the air bag to the base plate for subsequent handling as a subassembly. Subsequent mounting of this subassembly to the inflator is accomplished by aligning the corresponding four subassembly mounting holes with the inflator mounting holes and riveting the subassembly to the inflator.

6 Claims, 2 Drawing Sheets

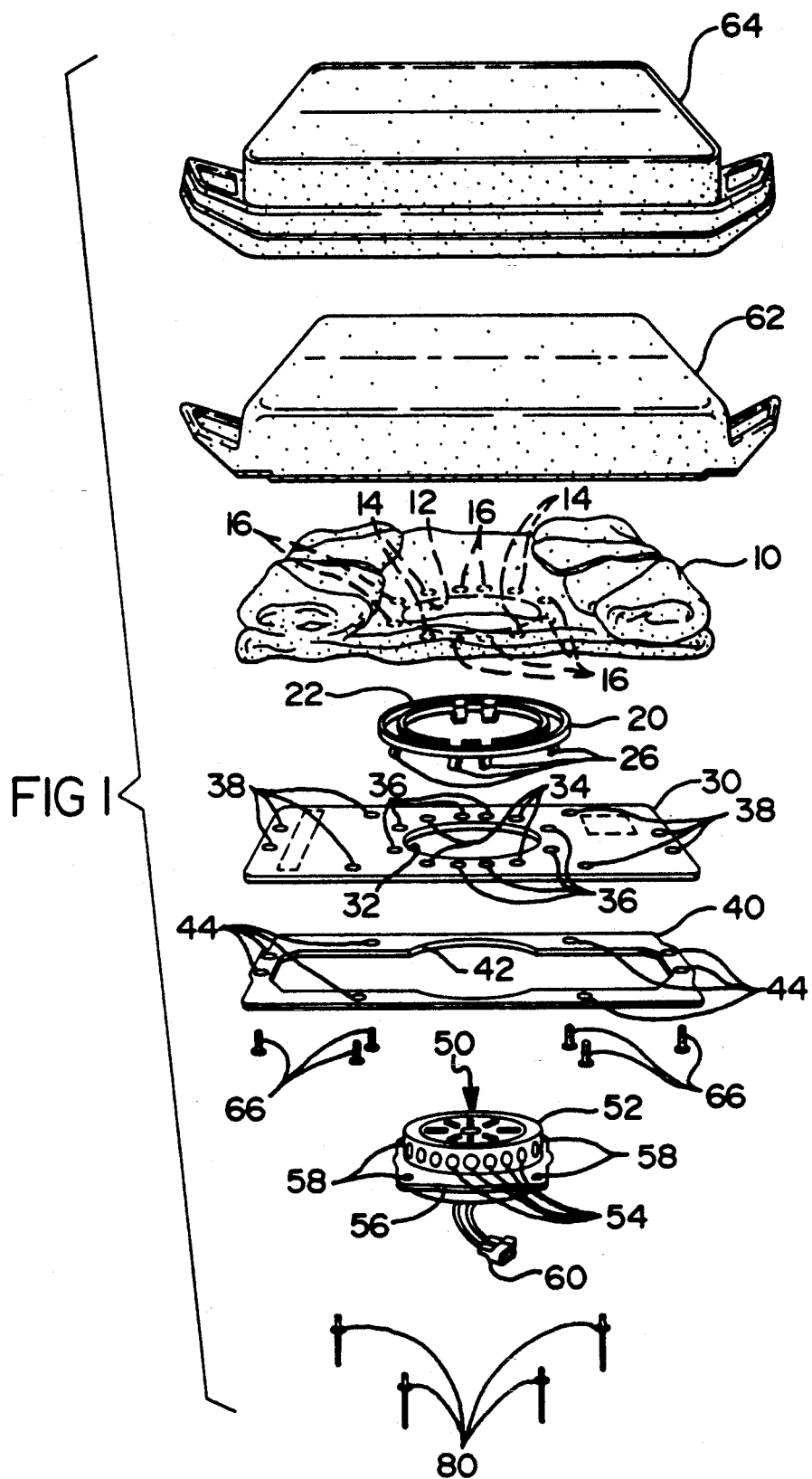

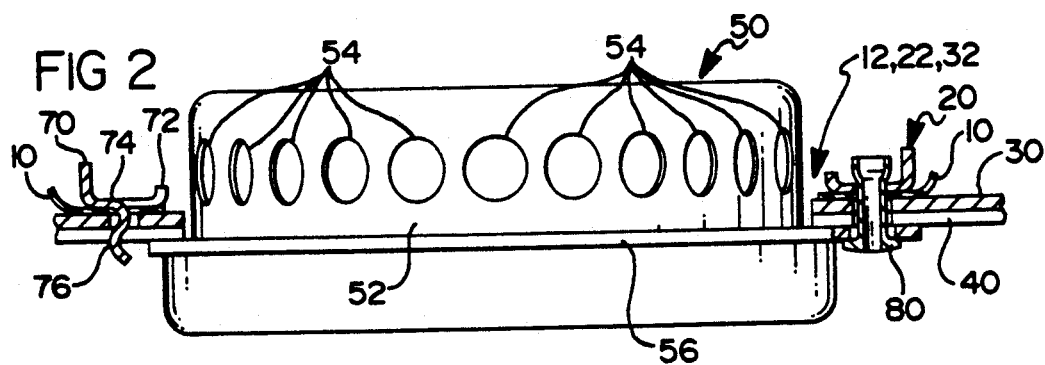
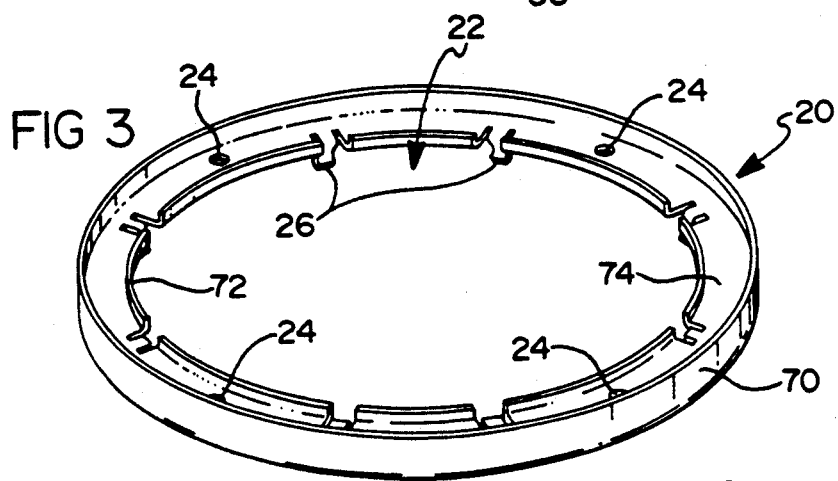
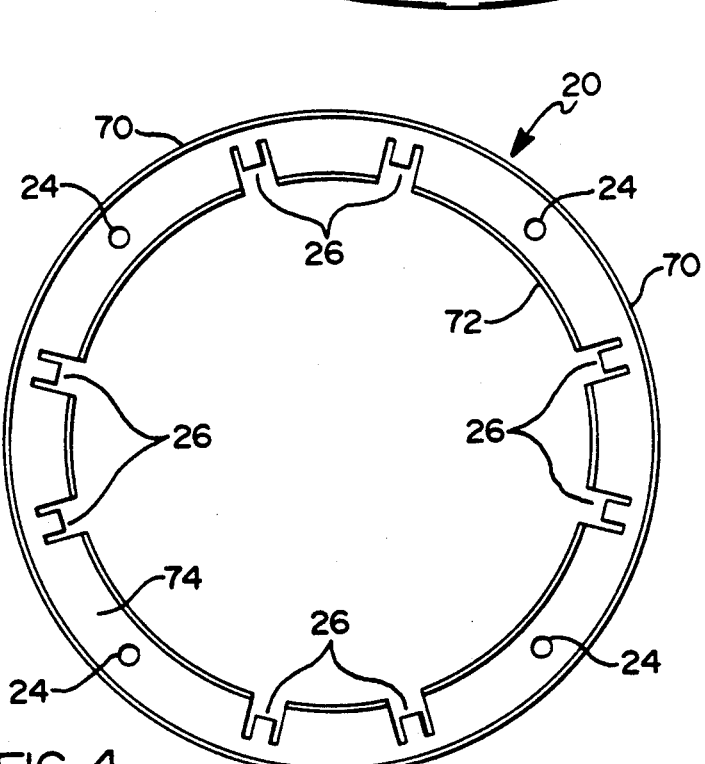
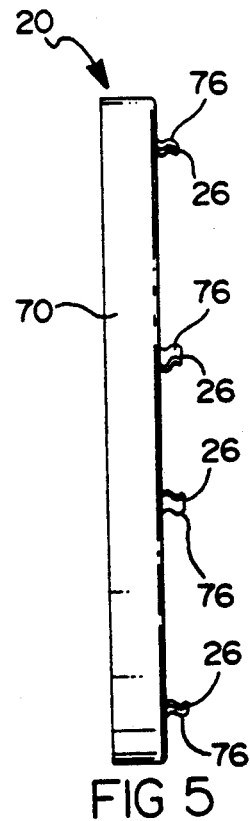

AIR BAG ATTACHMENT DEVICE

BACKGROUND OF THE INVENTION

This invention relates generally to inflatable restraint systems for passenger vehicles and, more particularly, to a device for attaching an air bag to an inflator.

Many vehicles have inflatable restraint systems which utilize an inflator which is attached to an air bag and to a vehicle support in the steering column, for the driver side air bag, and in an instrument panel recess, for the passenger side air bag.

In one system for the driver side air bag, the inflator includes mounting holes (e.g. 4) for attachment to a base plate which has a plurality of (e.g. 12) spaced mounting holes. The air bag has an internal cuff having a like number of mating holes. A retainer ring, having a like number of corresponding mounting holes is mounted inwardly of the air bag. The ring clamps the air bag cuff to the inflator base plate and to the inflator by rivets extending through the corresponding mounting holes. Such an arrangement is labor intensive and time consuming in that it requires alignment of the holes in all three elements and multiple riveting operations.

In another system, such as illustrated in U.S. Pat. No. 4,988,119 to Hartmeyer, the retaining ring is sewn to the air bag and is provided with apertured headed studs in place of the mounting apertures. The retainer ring is attached to the air bag by pressing the stud heads through the air bag mounting apertures. In some embodiments, integral locking tabs are folded back over the stud heads to lock the ring to the air bag.

Further assembly to the inflator is accomplished by extending the studs through the base plate apertures and riveting through the aligned apertures. This arrangement eliminates the necessity of aligning three sets of mounting holes, but still requires a multiplicity of rivets.

It would be desirable to provide a means for assembling an air bag to an inflator that is simpler, less labor intensive and, consequently, less expensive, while assuring integrity of the assembly.

SUMMARY OF THE INVENTION

It is therefore an object of this invention to provide a means for assembling an air bag to an inflator that is simpler, less labor intensive and, consequently, less expensive, while assuring integrity of the assembly.

Accordingly, this invention features an inflatable vehicle passenger restraint system comprising an inflatable air bag, having a central opening flanked by a plurality of spaced mounting holes, and an inflator base plate having a mating central opening flanked by a plurality of spaced mounting holes each corresponding to an air bag mounting hole. An attachment device for attaching the air bag to the base plate, comprises a unitary retainer ring having a central opening mating with the air bag and base plate openings, a plurality of spaced mounting holes corresponding to some of the air bag and base plate mounting holes, and a plurality of integral, spaced spring tabs extending from the surface of the retainer ring intermediate the mounting holes. The spring tabs extend sequentially through the remaining air bag and base plate mounting holes into engagement with the base plate to clamp the air bag to the base plate in a subassembly to facilitate subsequent handling thereof.

In one aspect, this invention features an inflatable vehicle passenger restraint system comprising an inflatable air bag, an inflator and a retainer ring. The air bag has a circular central opening flanked by a plurality of circumferentially-spaced mounting holes. The base plate is rectangular and has a circular central opening mating with the air bag opening and a plurality of circumferentially-spaced mounting holes, each corresponding to an air bag mounting hole. The circular inflator has a plurality of mounting holes mating with a minority of the air bag and base plate mounting holes. The retainer ring a unitary circular ring having an inside diameter sized to receive the inflator, a plurality of circumferentially-spaced mounting holes corresponding to the minority of air bag and base plate mounting holes, and a plurality of integral, circumferentially-spaced spring tabs extending from the surface of the ring. The tabs correspond to the remaining majority of the air bag and base plate mounting holes and extend sequentially therethrough to grip the base plate to clamp the air bag to the base plate in a subassembly for subsequent mounting to the inflator by fasteners extending through the minority of corresponding air bag and base plate and retainer ring and inflator mounting holes.

In another aspect, this invention features mounting holes and spring tabs on the retainer ring that are all equally, circumferentially spaced about the retainer ring.

In yet another aspect, this invention features a retainer ring having four equally-spaced mounting holes and two spring tabs located between any two mounting holes. The base plate mounting holes are preferably more closely diametrically spaced than the tabs such that the tabs grip the plate outwardly of the holes.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is an exploded perspective view of the component parts of an inflatable restraint system including a retainer ring, according to this invention;

FIG. 2 is an enlarged elevation of a mounting arrangement utilized in the restraint system of FIG. 1;

FIG. 3 is a perspective view of the retainer ring;

FIG. 4 is a plan view of the retainer ring; and

FIG. 5 is a side elevation of the retainer ring.

DETAILED DESCRIPTION OF A PREFERRED EMBODIMENT

Referring now to the drawings, FIG. 1 shows the component parts of an inflatable restraint system according to this invention. As is well-known, this type of restraint system is mounted in the hub of a steering wheel for deployment of the air bag upon detection of a threshold vehicle deceleration.

The restraint system includes an inflatable air bag 10, having a circular central opening 12 in its inner end that is flanked by a first plurality of four mounting holes 14 and a second plurality of eight mounting holes 16 located in pairs between holes 14.

A circular air bag retainer ring 20, includes a circular central opening 22 flanked by a plurality of four circumferentially-spaced mounting holes 24 and eight spring fingers or tabs 26 arranged in pairs between mounting holes 24. Mounting holes 24 correspond with air bag holes 14, while tabs 26 correspond to air bag holes 16.

A base plate 30 has a circular opening 32 that is flanked by a first plurality of mounting holes 34 that correspond with air bag holes 14 and retainer holes 24. A second plurality of eight mounting holes 36 are interspersed in pairs between holes 34 and correspond to air bag holes 16 and retainer ring tabs 26. Eight mounting apertures 38 are spaced about the periphery of base plate 30.

A pad retainer 40 includes a rectangular opening 42 having a circular central enlargement. Eight apertures 44, which mate with base plate apertures 38, are spaced around opening 42.

An inflator 50 has a generally cylindrical casing including an upper portion 52 that includes a plurality of circumferentially-spaced radial pressure gas discharge ports 54. Upper portion 52 terminates in a central mounting flange 56 which incorporates four spaced mounting holes 58 that correspond to air bag mounting holes 14, retainer ring mounting holes 24 and base plate mounting holes 34.

The usual rectangular container 62 and its decorative cover 64 are provided for covering the installed air bag. A plurality of fasteners such as bolts or rivets 66 are provided to mount container 62, as will be later described.

Referring now to FIGS. 3, 4 and 5, retainer ring 20 is preferably made of steel and has a generally U-shaped cross-section formed of an upstanding outer peripheral wall 70 and a shorter inner wall 72 defining central opening 22. Walls 70 and 72 are interconnected by a circular floor 74 that includes mounting holes 24. The eight spring tabs 26 are lanced or stamped from inner wall 72 and floor 74 and each have a serpentine shape forming an outer engagement shoulder 76.

Referring additionally to FIGS. 1 and 2, the restraint system is assembled by inserting retainer ring 20 within air bag opening 12 and tabs 26 are projected through mounting holes 16. This action assembles bag 10 to ring 20 and aligns ring mounting holes 24 with air bag holes 14.

Next, tabs 26 are projected through base plate mounting holes 36 to assemble the air bag 10 to the base plate 30. Retainer ring 20 is formed so that all spring tabs 26 have their engagement shoulders 76 located radially slightly outwardly of the outer edges of mounting holes 36 in base plate 30. This enables tabs 26 to spring through holes 36 and tightly grip base plate 30 to clamp air bag 10 to the base plate 30, as shown in FIG. 2. This forms a subassembly of retainer ring 20, air bag 10 and base plate 30 which can easily be handled subsequently without becoming accidentally disassembled.

The creation of this subassembly also facilitates further assembly of the inflatable restraint system. Further assembly of the system consists of mounting the inflator to the subassembly by aligning inflator mounting holes 58 with the aligned subassembly holes 14, 24, 34 and inserting rivets 80 which are upset to engage ring floor 74 and secure the inflator to the air bag and base plate.

The restraint system assembly is completed by inserting fasteners 66 through pad retainer holes 44 and base plate holes 38 so that flanges of container 62 (not shown) and flanges (not shown) of decorative cover 64 are sandwiched between base plate 30 and pad retainer 40.

The mating central circular openings 12, 22 and 32 all are sized to slidably receive inflator cylindrical portion 52, as shown in FIG. 2. The opening 42 of pad retainer 40 is large enough to clear inflator flange 56.

While only a preferred embodiment has been illustrated and described, obvious modifications thereof are contemplated within the scope of this invention and the following claims.

We claim:

1. In an inflatable vehicle passenger restraint system comprising an inflatable air bag, having a circular central opening flanked by a plurality of circumferentially-spaced mounting holes, a rectangular base plate having a mating circular central opening and a plurality of circumferentially-spaced mounting holes, each corresponding to an air bag mounting hole, and a circular inflator for the air bag having a plurality of mounting holes mating with a minority of the air bag and base plate mounting holes, an attachment device for attaching the air bag to the base plate and the inflator, comprising a unitary circular retainer ring of stamped metal construction having an inside diameter sized to receive the inflator therethrough, a plurality of circumferentially-spaced mounting holes corresponding to the minority of air bag and base plate mounting holes, a plurality of integral, circumferentially-spaced spring tabs of one-piece integral construction with the retainer ring and having a serpentine shape forming an outer engagement shoulder and extending from the surface of the retainer ring, the tabs corresponding to the remaining majority of the air bag and base plate mounting holes and receivable sequentially therethrough so that the outer engagement shoulder grips the base plate to clamp the air bag to the base plate in a subassembly for subsequent mounting thereof to the inflator, and a plurality of independent fasteners installed through the minority of corresponding air bag and base plate holes and the retainer ring and inflator mounting holes to attach the air bag to the inflator.

2. The attachment device of claim 1, wherein the mounting holes and spring tabs are all equally, circumferentially spaced about the retainer ring.

3. The attachment device of claim 2, wherein the retainer ring includes four equally-spaced mounting holes.

4. The attachment device of claim 3, wherein the retainer ring includes two spring tabs located between any two mounting holes.

5. The attachment device of claim 4, wherein the base plate mounting holes are more closely diametrically spaced than the tabs such that the tabs grip the plate outwardly of the holes.

6. In an inflatable vehicle passenger restraint system comprising an inflatable air bag, having a circular central opening flanked by a plurality of circumferentially-spaced mounting holes, a rectangular base plate having a mating circular central opening and a plurality of circumferentially-spaced mounting holes, each corresponding to an air bag mounting hole, and a circular inflator for the air bag having a plurality of mounting holes mating with a minority of the air bag and base plate mounting holes, an attachment device for attaching the air bag to the base plate and the inflator, comprising a unitary circular retainer ring of stamped metal construction and U-shaped cross section defining inner and outer walls connected by a base wall and having, an inside diameter sized to receive the inflator therethrough, a plurality of circumferentially-spaced mounting holes in the base wall corresponding to the minority of air bag and base plate mounting holes, and a plurality of integral, circumferentially-spaced spring tabs of one-piece integral construction struck from the retainer ring outer wall and base wall and having a serpentine shape forming an outer engagement shoulder and extending from the surface of the retainer ring, the tabs corresponding to the remaining majority of the air bag and base plate mounting holes and receivable sequentially therethrough so that the outer engagement should grip the base plate to clamp the air bag to the base plate in a subassembly for subsequent mounting thereof to the inflator and a plurality of independent fasteners installed through the minority of corresponding air bag and base plate holes and the retainer ring and inflator mounting holes to attach the air bag to the inflator.

* * * * *